United States Patent [19]

Matsumura et al.

[11] Patent Number: 5,608,563
[45] Date of Patent: Mar. 4, 1997

[54] SCANNER

[75] Inventors: Yukinori Matsumura; Koji Yoshida, both of Hiratsuka, Japan; Taku Yamazaki, Pittsburgh, Pa.

[73] Assignee: Komatsu Ltd., Tokyo, Japan

[21] Appl. No.: 331,653

[22] PCT Filed: May 7, 1993

[86] PCT No.: PCT/JP93/00599

§ 371 Date: Nov. 18, 1994

§ 102(e) Date: Nov. 18, 1994

[87] PCT Pub. No.: WO93/23781

PCT Pub. Date: Nov. 25, 1993

[30] Foreign Application Priority Data

May 8, 1992 [JP] Japan .................................. 4-116327

[51] Int. Cl.$^6$ .................................................. G02B 26/08
[52] U.S. Cl. ........................ 359/202; 359/201; 347/225
[58] Field of Search ................................ 359/201–202, 359/212–220, 36, 43, 45, 900; 250/234–236, 206.1, 206.2; 347/250, 110, 224, 225; 348/766, 790, 792; 358/474; 219/121.78–121.81

[56] References Cited

U.S. PATENT DOCUMENTS 4,952,034 8/1990 Azusawa et al. ..................... 359/202
5,309,273 5/1994 Mori et al. ............................ 359/202

FOREIGN PATENT DOCUMENTS

| 63-58208 | 4/1988 | Japan . |
| 64-59315 | 3/1989 | Japan . |
| 2-59755 | 2/1990 | Japan . |
| 2-268988 | 11/1990 | Japan . |
| 4-41259 | 2/1992 | Japan . |
| 4-127981 | 4/1992 | Japan . |

*Primary Examiner*—James Phan
*Attorney, Agent, or Firm*—Sidley & Austin

[57] ABSTRACT

To implement a high speed scanning, the positions in an image plane in the Y direction ("O") where no primary scanning is to be executed are removed. Only the positions in the Y direction ("1") where primary scanning is to be executed are stored in advance. On the other hand, the position in the Y direction which is currently being primary scanned is detected. Then, based on this result, the next position in the Y direction to be primary scanned ("1") is read from the stored information. The next primary scanning of the position in the Y direction thus read is started as soon as the current primary scanning is complete, thus making it possible to execute the scanning at a higher speed.

19 Claims, 3 Drawing Sheets

5,608,563

1

SCANNER

TECHNICAL FIELD

The present invention relates to a scanner, and particularly to an apparatus which increases a speed of scanning by a laser beam in a laser marker for marking at a higher speed.

BACKGROUND ART

There has been a demand for marking at a higher speed by a laser marker in recent years. A technique for attaining a higher speed of this kind is disclosed, for example, in Japanese Patent Application Laid-Open No. 2-268988. According to that technique, the display plane of a liquid crystal mask is divided into upper and lower halves in a laser marker. Upon the completion of the scanning of an upper half and the initiation of the scanning of a lower half, the replacement of a pattern of marking for the upper half is also initiated.

The aforesaid technique surely improves the speed of pattern replacement, but does not contribute anything to the attainment of a higher speed in terms of time required for scanning because scanning itself is executed over an entire image plane.

SUMMARY OF THE INVENTION

In view of the foregoing, it is an object of the present invention to provide an apparatus which is capable of increasing the scanning speed itself.

According to a first aspect of the present invention, there is provided a scanner which executes a primary scanning of a predetermined image plane in the X direction and executes secondary scanning in the Y direction perpendicular to the X direction, the scanner including storage means for storing in advance Y positions for which a primary scan is to be executed out of all of the Y positions in the image plane, position detecting means for detecting a Y position which is currently being primary scanned, and secondary scanning control means which, based on the result of detection by the position detecting means, reads from the stored information in the storage means the next Y position to be primary scanned and which starts primary scanning at the thus read next Y position as soon as the primary scanning of the Y position being currently primary scanned is complete.

According to a second aspect of the present invention, there is provided a similar scanner wherein the order of secondary scanning is obtained in advance based on Y positions to be primary scanned out of all of the Y positions in the image plane, and primary scanning is executed at each Y position in the thus obtained order of secondary scanning.

In a construction according to the first aspect of the present invention, the Y positions, where no primary scanning is executed in the image plane, are removed, and only the Y positions to be primary scanned are stored in advance. On the other hand, the Y position which is currently being primary scanned is detected. Then, based on that result, the next Y position to be primary scanned is read from the stored information, and the primary scanning of the thus read next Y position is started as soon as the primary scanning of the Y position currently being primary scanned is complete, thus making it possible to execute the scanning at a higher speed.

Also, in a construction according to the second aspect of the present invention, the Y positions in the image plane are thinned out, based on the Y positions to be primary scanned, by removing the Y positions which are not to be primary scanned, thereby obtaining the order of secondary scanning in advance. Primary scanning is executed at each Y position in the thus obtained order of secondary scanning, thus making it possible to execute the scanning at a higher speed.

BEST MODE FOR CARRYING OUT THE INVENTION

A scanner according to embodiments of the present invention will now be described with reference to the drawings.

Figure 1:
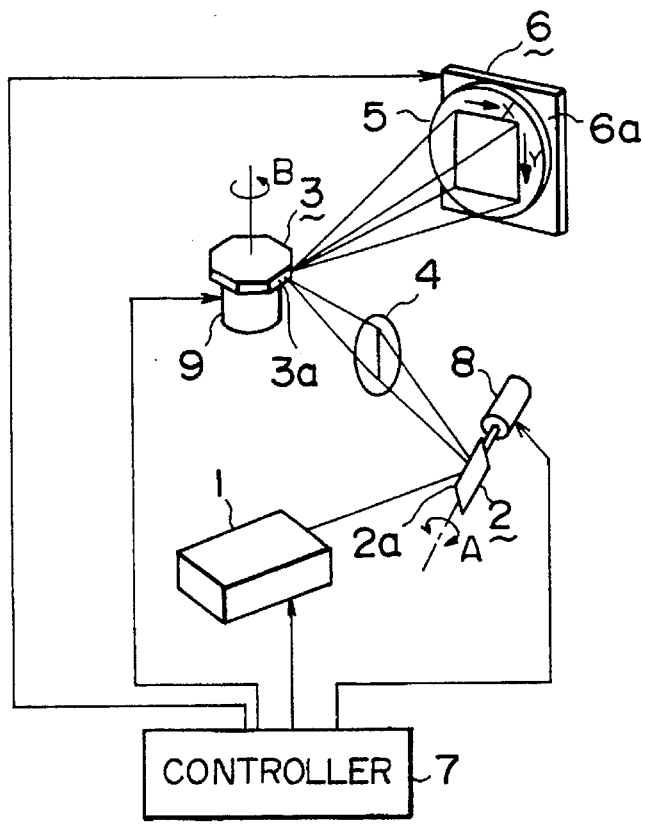
FIG. 1 is a view which illustrates a scanner of a laser marker according to the present invention.

FIG. 1 is a view which illustrates the embodiments of the present invention and which assumes an apparatus for scanning a liquid crystal mask in a laser marker by a laser beam.

A laser oscillator 1 produces a scanning laser beam, for example, a YAG laser beam. The produced laser beam impinges on a reflecting surface 2a of a deflector 2, which is a galvanometer scanner. The laser beam reflected at the reflecting surface 2a impinges on a reflecting surface 3a of a deflector 3, which is a polygon mirror, through a lens 4. The laser beam reflected at the reflecting surface 3a impinges on a liquid crystal display plane 6a of a liquid crystal mask 6 through a lens 5. The reflecting surface 2a of the deflector 2 is pivoted by a motor 8 in the direction represented by the arrow A, and the reflecting surface 3a of the deflector 3 is rotated by a motor 9 in the direction of an arrow B. Hence, as the reflecting surface 3a is rotated in the direction of the arrow B by driving and controlling the motor 9, the laser beam primary scans the liquid crystal display plane 6a of the liquid crystal mask in the direction of the arrow X, and also as the reflecting surface 2a is pivoted in the direction of the arrow A by driving and controlling the motor 8, the laser beam secondary scans the liquid crystal display plane 6a of the liquid crystal mask 6 in the direction of an arrow Y.

A controller 7 drives and controls the motors 8,9 and controls laser oscillations of the laser oscillator 1, and moreover outputs a signal to drive predetermined pixels on the liquid crystal display plane 6a of the liquid crystal mask 6.

In detail, based on information about a pattern of marking which has been inputted by predetermined input means, the controller 7 outputs a signal to drive corresponding pixels on the display plane 6a of the liquid crystal mask 6. In response to this signal, the corresponding pixels are driven on the display plane 6a of the liquid crystal mask 6. Then, the motors 8, 9 are driven and controlled, and the laser oscillator 1 is driven and controlled, thereby executing scanning by the laser beam. The laser beam penetrates through the portion of the driven pixels and marks the work surface with a character, symbol or the like corresponding to the shape of the portion of the driven pixels, i.e., the shape of the pattern of marking through a predetermined optical system (not shown).

Figures 2, 3:
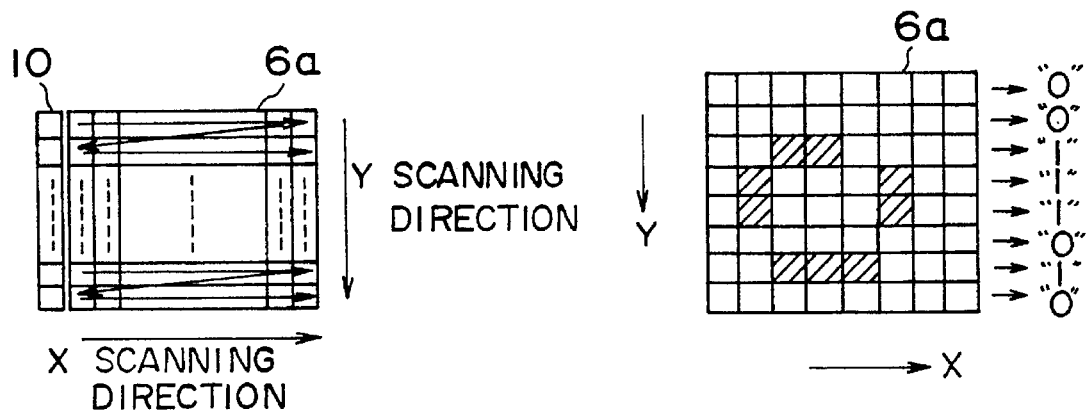
FIG. 2 is a view which illustrates how a laser beam scans the display plane of a liquid crystal mask of FIG. 1.
FIG. 3 is a view which illustrates a pattern of marking.

FIG. 2 illustrates how the laser beam scans the display plane 6a of the liquid crystal mask 6, the pixels in a predetermined row being scanned in order from the left by primary scanning in the X direction. Then, secondary scanning in the Y direction causes scanning to proceed to the next row below the row where X scanning has just been completed. As a result, it becomes possible for X scanning to scan the next row in order from the left. A photosensor 10 is disposed at each row of the display plane 6a to detect whether the row is currently being irradiated with the laser beam, for example, according to a photo reception level, and the result of detection by the photosensor 10 is sent to the controller 7. Based on an input signal from the photosensor 10, the controller 7 detects the row which is currently being scanned by the laser beam.

Figure 4:
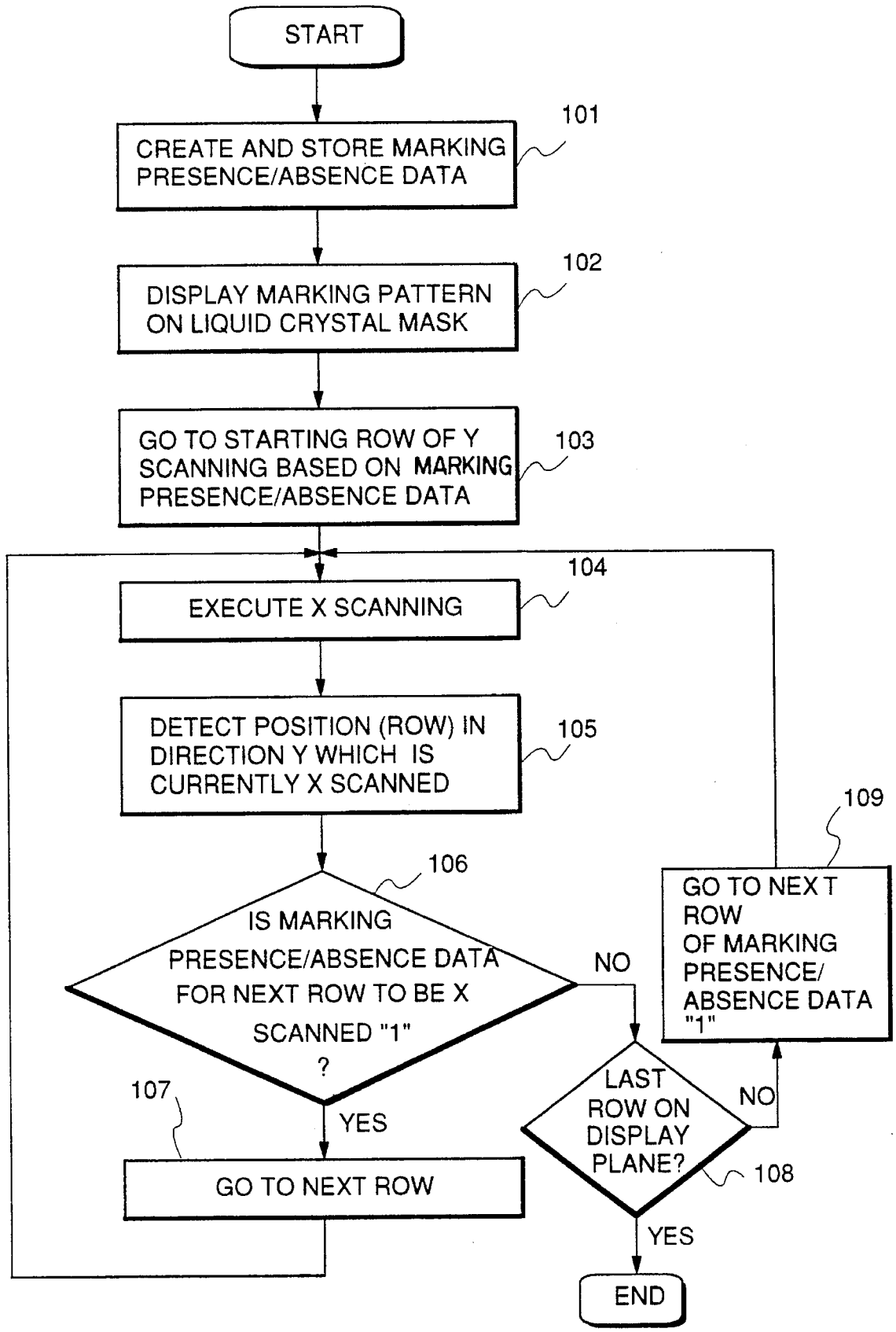
FIG. 4 is a flow chart which illustrates the processing of a first embodiment to be executed by the controller of FIG. 1.

The processing of a first embodiment which is executed by the controller 7 will now be described with further reference to a flow chart in FIG. 4. The controller 7 executes control so as to scan only those rows where driven pixels exist.

First, the controller 7 creates the marking presence/absence data based on the aforesaid information about a pattern of marking. The marking presence/absence data indicates "presence of marking" for a predetermined row on the display plane 6a if there is even one pixel to be marked for the row and indicates "absence of marking" for a predetermined row if there is no pixel to be marked for that row. In detail, as illustrated in FIG. 3, when only hatched pixels on the display plane 6a are to be driven for marking a work with a character or the like corresponding to the driven pixels, the marking presence/absence data for each row is of logic "1" or "O" level corresponding to "presence of marking" or "absence of marking", respectively. The data of logic "1" or "O" level is stored in a memory, which is the predetermined storage means of the controller 7 (step 101).

Next, a signal is sent to the liquid crystal mask 6 to drive corresponding pixels on the image plane 6a of the liquid crystal mask 6 based on a pattern of marking, thus driving the pixels. For example, for a pattern in FIG. 3, only hatched pixels are driven (step 102).

Then, the motor 8 is driven such that scanning starts from the starting row of Y scanning based on the marking presence/absence data created at step 101. For the pattern of marking in FIG. 3, the contents of the marking presence/absence data are "O" for the first and second rows, and hence the third row where the marking presence/absence data first becomes "1" is taken as the starting row; accordingly, the motor 8 is driven such that scanning starts from this starting row. Also, the motor 9 is driven such that scanning starts from the leftmost pixel on the third row (step 103).

Then, the motor 9 is driven to execute scanning in the X direction at the third row, where driven pixels exist. As a result, the laser beam penetrates only through hatched pixels on the third row for marking (step 104). Then, the Y position (row) which is currently being primary scanned in the X direction is detected by the position detecting means based on an output from the photosensor 10 (step 105).

Then, it is determined whether the data for the next row below the thus detected row is "1", i.e., whether the next row is to be primary scanned (step 106). Here, suppose that the third row is detected as the currently scanned row, and since the data for the fourth row is "1" (refer to FIG. 3), the result of the determination is YES, and accordingly the procedure proceeds to step 107; hence, the motor 8 is driven so as to go to the fourth row. Then, the aforesaid steps 104–107 are repeatedly executed for executing primary scanning as long as driven pixels exist (refer to the fourth and fifth rows in FIG. 3).

When the data for the next row is determined to be "O", i.e., NO at step 106, it is determined whether that row is the last row on the display plane 6a (step 108). Whether the next row is the last row is determined from whether or not the marking presence/absence data itself exists. In the case of the sixth row in FIG. 3, the data is "O", but the marking presence/absence data for the seventh row exists as "1"; hence, it is determined that the sixth row is not the last row, and accordingly the result of this determination becomes NO, and the procedure proceeds to step 109.

At step 109, the processing is executed to go to the next row where the marking presence/absence data is "1". In the case of the pattern of FIG. 3, since the data for the sixth row is "O" and since the primary scanning of this row has nothing to do with marking, the search for the next row of the data "1" is made. Here, since the data for the seventh row is "1", the motor 8 is driven so as to go to the seventh row. Back at step 104, the motor 9 is driven to execute primary scanning at the seventh row in the X direction. Steps for looping back from step 106 to step 104 are executed by the secondary scanning control means.

At step 106, since the data for the eighth row is "O", i.e., NO, the procedure proceeds to step 108. Since the eighth row is the actual last row, the result of determination is YES at step 108, thus putting an end to the processing on the assumption that marking is complete for one image plane.

According to the first embodiment, the photosensor 10 to detect the laser beam is provided on the side of the liquid crystal mask 6, and the Y position which is currently being primary scanned is detected based on an output from the photosensor 10; however, the present invention is not to be limited to this form, but the Y position can be detected by detecting the rotational position of the motor 8. Also, the Y position can be detected based on the contents of a drive instruction to the motor 8.

According to the first embodiment, whether the next row is to be scanned is determined during executing scanning, but it is also possible to execute scanning in a previously determined order.

Figure 5:
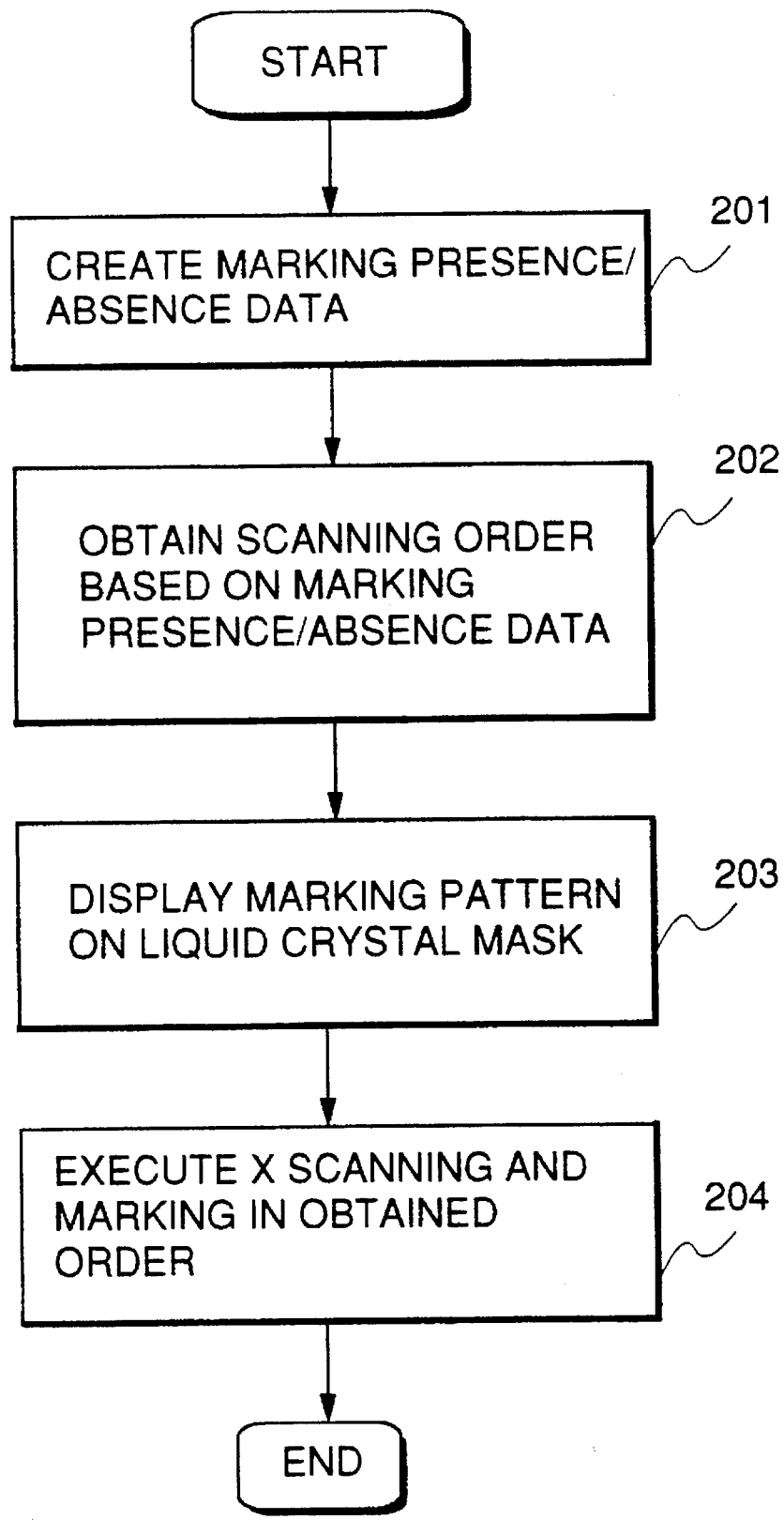
FIG. 5 is a flow chart which illustrates the processing of a second embodiment to be executed by the controller of FIG. 1.

In this connection, a second embodiment of the present invention will now be described with reference to the flow chart of FIG. 5. First, the marking presence/absence data is created as in the aforesaid step 101 (step 201). Then, the order of secondary scanning is obtained based on the created data. For example, for the pattern of marking shown in FIG. 3, the order of secondary scanning is the third, fourth, fifth and seventh rows, the contents of the data for which are "1". A drive instruction to the motor 8 is created such that primary scanning is executed in this order of secondary scanning (step 202).

Then, as in the aforesaid step 102, a pattern of marking is displayed on the liquid crystal mask 6 (step 203), the drive instruction created at the aforesaid step 202 is sent to the motor 8, and a drive instruction is sent to the motor 9 to execute primary scanning at each "1" row. As a result, primary scanning is executed in order only at the rows the contents of the data for which are "1", i.e., only at the rows where driven pixels exist, thus reducing the processing time (step 204). Since the second embodiment does not require the photosensors 10, it has an advantage in that the cost of the scanner is reduced accordingly.

The first and second embodiments of the present invention have been described on the assumption that an object of application is a laser marker; however, the present invention is not to be limited to this form, but can be applicable to any other forms if they allow primary scanning at predetermined rows to be omitted. Also, the first and second embodiments assume that primary scanning is executed in the lateral direction (X direction) of the display plane, but primary scanning can be executed in the longitudinal direction. In this case, the marking presence/absence data can be created in columns, not in rows.

INDUSTRIAL APPLICABILITY

The present invention serves effectively in a laser marker as a scanner which increases the speed of scanning by a laser beam and greatly improves the work efficiency by marking at a higher speed.

What is claimed is:

1. A scanner which uses a laser beam to scan a predetermined image plane on a liquid crystal mask in a laser marker by executing primary scanning in an X direction and executing secondary scanning in a Y direction perpendicular to the X direction, the predetermined image plane comprising a plurality of Y positions to form a pattern of marking on the predetermined image plane; said scanner including:

means for creating presence/absence data for each Y position indicating the presence/absence of any marking in the respective Y position;

storage means for storing in advance information on Y positions having data indicating a presence of a marking in the respective Y position;

position detecting means for detecting a Y position which is currently being primary scanned; and secondary scanning control means which, responsive to the detection by the position detecting means of a Y position currently being primary scanned, reads from the thus stored information in said storage means the next Y position having data indicating a presence of a marking in the respective Y position, and which starts primary scanning at the thus read next Y position as soon as the primary scanning of the Y position currently being primary scanned is complete.

2. A scanner in accordance with claim 1, wherein each Y position has a plurality of pixels, and wherein pixels can be selectively driven to form said pattern of marking on the predetermined image plane.

3. A scanner in accordance with claim 2, wherein said storage means stores, as Y positions to be primary scanned by the laser beam, only the Y positions having at least one pixel to be driven for the formation of said pattern of marking.

4. A scanner in accordance with claim 3, wherein said position detecting means for detecting a Y position which is currently being primary scanned comprises a plurality of photosensors, each photosensor being associated with a respective Y position to detect whether the respective Y position is currently irradiated with the laser beam.

5. A scanner in accordance with claim 1, wherein said position detecting means for detecting a Y position which is currently being primary scanned comprises a plurality of photosensors, each photosensor being associated with a respective Y position to detect whether the respective Y position is currently irradiated with the laser beam.

6. A scanner which uses a laser beam to scan a predetermined image plane on a liquid crystal mask in a laser marker by executing primary scanning in an X direction and executing secondary scanning in a Y direction perpendicular to the X direction, the predetermined image plane comprising a plurality of Y positions; said scanner comprising:

means for creating in advance an order of secondary scanning of Y positions in said predetermined image plane, wherein said order contains only Y positions to be primary scanned and excludes Y positions which are not to be primary scanned, and means for executing primary scanning only at each Y position in the thus obtained order of secondary scanning.

7. A scanner in accordance with claim 6, wherein said means for executing primary scanning comprises means for shifting, upon completion of a primary scanning of a Y position, to the next Y position in said order of secondary scanning.

8. A scanner in accordance with claim 7, wherein each Y position has a plurality of pixels, and wherein pixels can be selectively driven to form a pattern of marking on the predetermined image plane.

9. A scanner in accordance with claim 8, wherein said means for creating stores, as Y positions to be primary scanned by the laser beam, only the Y positions having at least one pixel to be driven for the formation of said pattern of marking.

10. A scanner in accordance with claim 8, wherein said Y positions to be primary scanned are those remaining after removing the Y positions where no marking is to be executed, based on a pattern of marking on the liquid crystal mask.

11. A scanner in accordance with claim 6, wherein each Y position has a plurality of pixels, and wherein pixels can be selectively driven to form a pattern of marking on the predetermined image plane.

12. A method which comprises:

using a laser beam to scan a predetermined image plane on a liquid crystal mask in a laser marker by executing primary scanning in an X direction and executing secondary scanning in a Y direction perpendicular to the X direction, the predetermined image plane including a plurality of Y positions for forming a pattern of marking on the predetermined image plane;

creating presence/absence data for each Y position indicating the presence/absence of any marking in the respective Y position;

inputting a signal to the liquid crystal mask to form said pattern of marking on the predetermined image plane;

determining the first Y position having data indicating the presence of marking in that Y position;

beginning a scanning of said predetermined image plane by executing a primary scanning starting with the thus determined first Y position having data indicating the presence of marking in that Y position;

detecting a Y position which is currently being primary scanned; and ascertaining the next Y position having data indicating the presence of marking in that Y position; and executing primary scanning at the thus ascertained next Y position as soon as the primary scanning of the Y position currently being primary scanned is complete;

whereby primary scanning is executed for each Y position having data indicating the presence of marking in such Y position and primary scanning is skipped for each Y position having data indicating the absence of marking in such Y position.

13. A method in accordance with claim 12, further comprising ascertaining whether the next Y position is the last Y position in the predetermined image plane; and terminating the scanning upon the completion of the primary scanning of the last Y position in the predetermined image plane having data indicating the presence of marking in the respective Y position.

14. A method in accordance with claim 12, wherein each Y position has a plurality of pixels, wherein pixels can be selectively driven to form said pattern of marking on the predetermined image plane, and wherein said step of inputting a signal to the liquid crystal mask to form said pattern of marking on the predetermined image plane comprises driving pixels which correspond to said pattern of marking such that none of the pixels in at least one Y position are driven.

15. A method in accordance with claim 14, further comprising ascertaining whether the next Y position is the last Y position in the predetermined image plane; and terminating the scanning upon the completion of the primary scanning of the last Y position in the predetermined image plane having data indicating the presence of marking in the respective Y position.

16. A method in accordance with claim 15 wherein the step of ascertaining the next Y position having data indicating the presence of marking in that Y position is performed responsive to the detection of a Y position currently being primary scanned.

17. A method in accordance with claim 12 wherein the step of ascertaining the next Y position having data indicating the presence of marking in that Y position is performed responsive to the detection of a Y position currently being primary scanned.

18. A method in accordance with claim 12 wherein the step of ascertaining the next Y position having data indicating the presence of marking in that Y position comprises storing, in advance, information on the order of the Y positions having data indicating the presence of marking in the respective Y position, and, responsive to the detection of a Y position currently being primary scanned, reading from the thus stored information the next Y position having data indicating the presence of marking in that Y position.

19. A method which comprises:

using a laser beam to scan a predetermined image plane on a liquid crystal mask in a laser marker by executing primary scanning in an X direction and executing secondary scanning in a Y direction perpendicular to the X direction, the predetermined image plane including a plurality of Y positions for forming a pattern of marking on the predetermined image plane;

creating presence/absence data for each Y position indicating the presence/absence of any marking in the respective Y position;

creating from said presence/absence data a scanning order of only the Y positions indicating the presence of any marking in the respective Y position;

storing the thus created scanning order;

inputting a signal to the liquid crystal mask to form said pattern of marking on the predetermined image plane;

beginning a scanning of said predetermined image plane by executing a primary scanning starting with the first Y position in the thus stored scanning order;

executing primary scanning at the next Y position in said stored scanning order as soon as the primary scanning of a Y position is complete;

whereby primary scanning is executed only for the Y positions in said stored scanning order.

\* \* \* \* \*